(12) United States Patent
Kishimoto et al.

(10) Patent No.: US 8,829,098 B2
(45) Date of Patent: Sep. 9, 2014

(54) POLYLACTIC ACID RESIN COMPOSITION

(75) Inventors: Hiroaki Kishimoto, Wakayama (JP); Akira Takenaka, Wakayama (JP); Yukihiro Kiuchi, Tokyo (JP); Tsunenori Yanagisawa, Tokyo (JP); Kazuhiko Inoue, Tokyo (JP); Masatoshi Iji, Tokyo (JP); Shin Serizawa, Tokyo (JP)

(73) Assignees: KAO Corporation, Tokyo (JP); NEC Corporation, Tokyo (JP)

( * ) Notice: Subject to any disclaimer, the term of this patent is extended or adjusted under 35 U.S.C. 154(b) by 0 days.

(21) Appl. No.: 12/937,084

(22) PCT Filed: Apr. 8, 2009

(86) PCT No.: PCT/JP2009/057545
§ 371 (c)(1),
(2), (4) Date: Nov. 23, 2010

(87) PCT Pub. No.: WO2009/125872
PCT Pub. Date: Oct. 15, 2009

(65) Prior Publication Data
US 2011/0060080 A1    Mar. 10, 2011

(30) Foreign Application Priority Data

Apr. 8, 2008 (JP) ................................. 2008-100065
Apr. 8, 2008 (JP) ................................. 2008-100067

(51) Int. Cl.
| | | |
|---|---|---|
| *C08G 63/60* | (2006.01) | |
| *C08K 9/06* | (2006.01) | |
| *C08G 63/08* | (2006.01) | |
| *C08G 63/91* | (2006.01) | |
| *C09D 167/04* | (2006.01) | |
| *C08K 5/54* | (2006.01) | |

(52) U.S. Cl.
CPC . *C08K 9/06* (2013.01); *C08G 63/08* (2013.01); *C08G 63/912* (2013.01); *C09D 167/04* (2013.01); *C08K 5/54* (2013.01)
USPC ............................ 524/437; 524/599; 525/450

(58) Field of Classification Search
None
See application file for complete search history.

(56) References Cited

U.S. PATENT DOCUMENTS

| | | | | |
|---|---|---|---|---|
| 6,376,077 | B1* | 4/2002 | Hiraishi et al. ................ | 428/403 |
| 2005/0182201 | A1* | 8/2005 | Matsumoto et al. ........... | 525/418 |
| 2007/0142503 | A1* | 6/2007 | Yamada et al. ................ | 523/212 |
| 2007/0203287 | A1* | 8/2007 | Tanaka et al. ................. | 524/556 |
| 2008/0053153 | A1* | 3/2008 | Aoki ............................... | 65/33.9 |
| 2008/0071015 | A1 | 3/2008 | Kiuchi et al. | |
| 2008/0262150 | A1* | 10/2008 | Takenaka et al. ............ | 524/599 |

FOREIGN PATENT DOCUMENTS

| | | |
|---|---|---|
| EP | 1 795 561 A1 | 6/2007 |
| EP | 1 900 710 A1 | 3/2008 |
| JP | 11-349851 A | 12/1999 |
| JP | 2001-302234 A | 10/2001 |
| JP | 2004-18775 A | 1/2004 |
| JP | 2005-120119 A | 5/2005 |
| JP | 2006-89643 A | 4/2006 |
| JP | 2007-16152 A | 1/2007 |
| WO | WO 2005/061626 A1 | 7/2005 |
| WO | WO 2005108501 A1 * | 11/2005 |
| WO | 2006-182798 A | 7/2006 |

OTHER PUBLICATIONS

International Search Report dated Jul. 14, 2009 in International Application No. PCT/JP2009/057545.
Machine English translation of JP 11-349851, Dec. 21, 1999.
Machine English translation of JP 2001-302234, Oct. 31, 2001.
Machine English translation of JP 2004-18775, Jan. 22, 2004.
Machine English translation of JP 2005-120119, May 12, 2005.
Machine English translation of JP 2006-182798, Jul. 13, 2006.
Machine English translation of JP 2006-89643, Apr. 6, 2006.
Machine English translation of JP 2007-16152, Jan. 25, 2007.
International Preliminary Report on Patentability dated Nov. 30, 2010, issued in PCT International Application No. PCT/JP2009/057545.
Office Action dated Feb. 6, 2012, issued in Chinese Patent Application No. 200980112262.4, with English Translation.
Notification of the 2nd Office Action issued Dec. 5, 2012, in Chinese Patent Application No. 200980112262.4, with English translation.
Extended European Search Report issued Aug. 16, 2013, in European Patent Application No. 09729956.4.

* cited by examiner

*Primary Examiner* — Robert C Boyle
(74) *Attorney, Agent, or Firm* — Birch, Stewart, Kolasch & Birch, LLP

(57) ABSTRACT

The present invention provides a polylactic acid resin composition, containing a polylactic acid resin and a metal hydrate surface-treated with at least one silane coupling agent selected from an amino-silane coupling agent, a mercapto-silane coupling agent and an isocyanate-silane coupling agent, wherein the content of an alkali metal component in the metal hydrate is not more than 0.2% by mass and a polylactic acid resin molded article produced by molding the polylactic acid resin composition.

7 Claims, No Drawings

US 8,829,098 B2

POLYLACTIC ACID RESIN COMPOSITION

FIELD OF THE INVENTION

The present invention relates to a polylactic acid resin composition and a polylactic acid resin molded article.

BACKGROUND OF THE INVENTION

Among biodegradable resins, polylactic acid resins are now expected to expand applications, because a production cost of L-lactic acid has been reduced by a high-volume production thereof by fermentation of sugars derived from corn and potato, these raw materials are natural agricultural crops and emit a very small amount of carbon dioxide, and the produced resins have high rigidity and good transparency. Polylactic acid resins are, however, brittle and rigid materials lacking flexibility. Due to such characteristics, there are a wide variety of applications of these resins in consumption commodities such as packaging materials and daily necessaries but scarcely any in the field of durable items that are required to satisfy high demand characteristics such as injection-molded parts for home electronics and vehicles. Injection-molded parts of polylactic acid resins have problems of insufficient flexibility, impact resistance, and mechanical strength, whitening in bending, and low hinge characteristics, and are useless under present circumstances.

Polylactic acid resins also have a disadvantage of low crystallization speed, and are in an amorphous state after molded unless subjected to mechanical treatments such as stretching. However, polylactic acid resins have low glass transition temperature (Tg) as around 60° C. and low heat resistance, and have a problem of being unusable under conditions of 55° C. or higher.

Further, if a polylactic acid resin is used in durable items such as a part for home electronics and vehicles, the resin must have flexibility at a certain level as well as heat resistance and impact resistance.

JP-A-2005-120119 discloses a flame retardant injection-molded product having both flame retardancy and durability, containing a lactic acid resin, a metal hydroxide surface-treated with a silane coupling agent, and an aromatic carbodiimide. This patent describes that a preferred silane coupling agent is epoxysilane and there are only examples using an epoxysilane coupling agent. Use of a metal hydroxide surface-treated with an epoxysilane coupling agent, however, achieves insufficient effects. Therefore, there is still a demand for developing a polylactic acid resin composition having high impact resistance and flexibility.

SUMMARY OF THE INVENTION

The present invention provides a polylactic acid resin composition, containing a polylactic acid resin and a metal hydrate surface-treated with at least one silane coupling agent selected from an amino-silane coupling agent, a mercapto-silane coupling agent and an isocyanate-silane coupling agent, wherein the content of an alkali metal substance in the metal hydrate is not more than 0.2% by mass.

The present invention further provides a polylactic acid resin molded article produced by molding the above polylactic acid resin composition.

DETAILED DESCRIPTION OF THE INVENTION

The present invention provides a polylactic acid resin composition having high impact resistance and flexibility, and a polylactic acid resin molded article, produced therefrom.

The polylactic acid resin composition of the present invention exhibits high impact resistance and flexibility.

The polylactic acid resin composition of the present invention containing an isocyanate-silane coupling agent further exhibits good heat resistance.

[Polylactic Acid Resin]

The polylactic acid resin used in the present invention is a polymer of lactic acid or a copolymer of lactic acid with a hydroxycarboxylic acid. Examples of the hydroxycarboxylic acid include glycolic acid, hydroxybutyric acid, hydroxyvaleric acid, hydroxypentanoic acid, hydroxycaproic acid, and hydroxyheptanoic acid. Preferred are glycolic acid and hydroxycaproic acid. The polymer of lactic acid preferably has a molecular structure constructed of 20 to 100% by mol of L-lactic acid or D-lactic acid unit and 0 to 80% by mol of the enantiomer unit thereof.

In the present invention, a stereocomplex polylactic acid may also be used for the polylactic acid resin. The stereocomplex polylactic acid is composed of a polylactic acid unit (A) containing 90 to 100% by mol of L-lactic acid and 0 to 10% by mol of the other components including D-lactic acid and a polylactic acid unit (B) containing 90 to 100% by mol of D-lactic acid and 0 to 10% by mol of the other components including L-lactic acid at a mass ratio of (A) to (B), (A)/(B), of 10/90 to 90/10. The other components than lactic acid isomers in polylactic acid units (A) and (B) constituting the stereocomplex polylactic acid include compounds having two or more functionalities capable of forming an ester bond such as dicarboxylic acids, polyhydric alcohols, hydroxycarboxylic acids, and lactones. The other units include that composed of the other components and mixtures thereof such as polyesters, polyethers, and polycarbonates having two or more unreacted functionalities capable of forming an ester bond.

The copolymer of lactic acid and the hydroxycarboxylic acid is, for example, constructed of 85 to 100% by mol of L- or D-lactic acid unit and 0 to 15% by mol of the hydroxycarboxylic acid unit. These polylactic acid resins can be produced by dehydrative polymerization condensation of raw materials having required structures selected from L-lactic, D-lactic, and hydroxycarboxylic acids. These polylactic acid resins can be preferably produced by ring-opening polymerization of raw materials having required structures selected from lactide being a cyclic dimer of lactic acid, glycolide being a cyclic dimer of glycolic acid, and caprolactone and the like. Lactide includes L-lactide, which is a cyclic dimer of L-lactic acid, D-lactide, which is a cyclic dimer of D-lactic acid, meso-lactide, which is a cyclic dimer of D-lactic acid and L-lactic acid, and DL-lactide, which is a racemate of D-lactide and L-lactide. Any of these lactides may be used in the present invention. Preferably used for a main material is D-lactide or L-lactide.

From the viewpoint of heat resistance, preferred polylactic acid resins are those containing a crystalline polylactic acid having 90% or higher optical purity and other polylactic acid having a optical purity less than 90% at a mass ratio, crystalline polylactic acid having 90% or higher optical purity/other polylactic acid having a optical purity less than 90%, of 100/0 to 10/90, preferably 100/0 to 25/75, even more preferably 100/0 to 50/50, and even more preferably 100/0 to 90/10.

Examples of a commercially available polylactic acid resin include Lacea (trade name, Mitsui Chemicals, Inc.), Nature works (trade name, Nature works LLC), and Eco Plastic U'z (trade name, Toyota Motor Corporation).

Among these resins, preferred are Lacea H-100, H-280, H-400, H-440 (trade name, Mitsui Chemicals, Inc.); Nature works (trade name, Nature works LLC); and Eco Plastic U' z (trade name, Toyota Motor Corporation).

From the viewpoint of heat resistance, crystalline polylactic acid resins having high L-lactic acid purity are preferred. These resins are preferably orientated and crystallized by stretching. Examples of the crystalline polylactic acid resin include Lacea H-100, H-400, H-440 (trade name, Mitsui Chemicals, Inc.), and Eco Plastic U'z S-09, S-12, S-17 (trade name, Toyota Motor Corporation).

[Metal Hydrate Surface-Treated with a Silane Coupling Agent]

For achieving effects of the present invention, the metal hydrate surface-treated with a silane coupling agent used in the present invention is preferably prepared by using the silane coupling agent and the metal hydrate at a mass ratio, silane coupling agent/metal hydrate, of 0.1/99.9 to 5/95, more preferably 0.3/99.7 to 3/97, and even more preferably 0.5/99.5 to 2/98 in the surface-treatment.

Examples of an amino-silane coupling agent used in the present invention include N-2(aminoethyl)γ-aminopropylmethyldimethoxysilane, N-2(aminoethyl) γ-aminopropyltrimethoxysilane, N-2(aminoethyl) γ-aminopropyltriethoxysilane, 3-aminopropyltrimethoxysilane, 3-aminopropyltriethoxysilane, N-phenyl-3-aminopropyltrimethoxysilane, and N-phenyl-3-aminopropyltriethoxysilane. For increasing toughness of the polylactic acid resin composition, preferably used is at least one agent selected from N-phenyl-3-aminopropyltrimethoxysilane and N-phenyl-3-aminopropyltriethoxysilane.

Examples of a mercapto-silane coupling agent used in the present invention include, 3-mercaptopropyltrimethoxysilane, 3-mercaptopropyltriethoxysilane, 3-octanoylthio-1-propyltriethoxysilane, and 3-mercaptopropylmethyldimethoxysilane. For increasing toughness of the polylactic acid resin composition, preferably used is at least one agent selected from 3-mercaptopropyltrimethoxysilane and 3-mercaptopropyltriethoxysilane.

For an isocyanate-silane coupling agent, used is at least one agent selected from 3-isocyanatepropyltrimethoxysilane and 3-isocyanatepropyltriethoxysilane.

For controlling hydrolysis of the polylactic acid resin, the metal hydrate used in the present invention contains an alkali metal substance or an alkali metal-like substance in an amount of not more than 0.2% by mass.

Examples of the metal hydrate include aluminium hydroxide, magnesium hydroxide, dawsonite, calcium aluminate, hydrate gypsum, calcium hydroxide, zinc borate, bariummetaborate, borax, kaolin clay, and calcium carbonate. Preferred is at least one metal hydrate selected from aluminium hydroxide, magnesium hydroxide and calcium hydroxide, and more preferred is aluminium hydroxide.

The metal hydrate is preferably in the form of particles having an average particle size of not more than 10 μm, and more preferably having an average particle size of 0.1 to 5 μm.

An average particle size of the metal hydrate can be determined by measuring a median size based on the volume by diffractive scattering. Examples of a commercial measurement apparatus include Beckman Coulter LS 230 Laser Diffraction Particle Size Analyzer.

For preparing the metal hydrate surface-treated with the silane coupling agent, any method can be used without specific limitation. For example, used is a method of splaying or applying a solution of the silane coupling agent in solvents such as acetone, ethyl acetate, toluene, or the like to the surface of the metal hydrate containing an alkali metal substance in an amount of not more than 0.2% by mass, and drying to remove the solvent.

[Plasticizer]

The polylactic acid resin composition of the present invention preferably further contains a plasticizer.

Any plasticizer can be used in the present invention without specific limitation. Examples of the plasticizer include esters of polybasic acids such as malonic acid, succinic acid, glutaric acid, adipic acid, and 1,3,6-hexanetricarboxylic acid with polyethylene glycol mono alkylethers such as diethylene glycol monomethyl ether, diethylene glycol monoethyl ether, triethylene glycol monomethyl ether, triethylene glycol monoethyl ether, and tetraethylene glycol monomethyl ether; an acetylated product of an adduct in which ethylene oxide and/or propylene oxide is added to a polyhydric alcohol such as glycerol, ethylene glycol, diglycerol or 1,4-butanediol; hydroxybenzoates such as 2-ethylhexyl hydroxybenzoate; phthalates such as di-2-ethylhexyl phthalate; adipates such as dioctyl adipate; maleates such as di-n-butyl maleate; citrates such as tributyl acetylcitrate; alkyl phosphates such as tricresyl phosphate; tricarboxylates such as trioctyl trimellitate; acetylated polyoxyethylene alkyl (alkyl group having 2 to 15 carbon atoms) ethers such as acetylated polyoxyethylene hexyl ether. From the viewpoints of better flexibility, transparency, and crystallization speed of the polylactic acid resin, preferred is at least one plasticizer selected from the group consisting of polyethylene glycol (average addition mole number of ethylene oxide: 0.5 to 5) monomethyl ether esters of succinic acid, adipic acid or 1,3,6-hexanetricarboxylic acid, and acetic acid ester of ethylene oxide adduct to glycerol or ethylene glycol (average addition mole number of ethylene oxide of 3 to 20).

[Organic Crystallization Nucleator]

The polylactic acid resin composition of the present invention preferably further contains an organic crystallization nucleator.

Examples of the organic crystallization nucleator include amides such as fatty acid monoamide, fatty acid bisamide, aromatic carboxamide, and rosin acid amide; hydroxy fatty acid esters; metal salts such as metal salts of aromatic sulfonic acid dialkyl esters, metal salts of phenylphosphonic acids, metal salts of phosphoric acid esters, and metal salts of rosin acid; and others such as carbohydrazides, N-substituted ureas, and organic pigments. From the viewpoints of moldability, heat resistance, and impact resistance, and blooming resistance of the organic crystallization nucleator, preferred is at least one nucleator selected from the group consisting of compounds having a hydroxy group and an amide group in a molecule and hydroxy fatty acid esters, more preferred is a combination of at least one of them with a phenylphosphonic acid metal salt, and even more preferred is a combination of a compound having a hydroxy group and an amide group in a molecule with a phenylphosphonic acid metal salt.

For increasing compatibility with the polylactic acid resin, for compounds having a hydroxy group and an amide group in a molecule, preferred are aliphatic amides having two or more hydroxy groups and two or more amide groups. For increasing dispersibility of the organic crystallization nucleator in kneading and increasing crystallization speed of the polylactic acid resin composition, the compound having a hydroxy group and an amide group in a molecule preferably has a melting point of not less than 65° C., more preferably 70 to 220° C., and even more preferably 80 to 190° C.

Specific examples of the compound having a hydroxy group and an amide group in a molecule include hydroxy fatty acid monoamides such as 12-hydroxystearic acid monoethanolamide; and hydroxy fatty acid bisamides such as methylene-bis(12-hydroxystearic acid amide), ethylene-bis (12-hydroxystearic acid amide), and hexamethylene-bis(12- hydroxystearic acid amide). From the viewpoint of moldability, heat resistance, impact resistance, and blooming resistance of the polylactic acid resin composition, preferred are alkylene-bis(hydroxystearic acid amide) s such as methylene-bis(12-hydroxystearic acid amide), ethylene-bis(12-hydroxystearic acid amide) or hexamethylene-bis(12-hydroxystearic acid amide), and more preferred is ethylene-bis (12-hydroxystearic acid amide).

Specific examples of the hydroxy fatty acid ester include hydroxystearates such as 12-hydroxystearic acid triglyceride, 12-hydroxystearic acid diglyceride, 12-hydroxystearic acid monoglyceride, pentaerythritol-mono-12-hydroxystearate, pentaerythritol-di-12-hydroxystearate, and pentaerythritol-tri-12-hydroxystearate. From the viewpoint of moldability, heat resistance, and impact resistance of the polylactic acid resin molded article, and blooming resistance of the organic crystallization nucleator, preferred is 12-hydroxystearic acid triglyceride.

The phenylphosphonic acid metal salt used in the present invention is a phenylphosphonic acid metal salt having a phenyl group that may be substituted and a phosphone group ($-PO(OH)_2$). Examples of the substituent of the phenyl group include alkyl groups having 1 to 10 carbon atoms and alkoxycarbonyl groups of which an alkoxy group having 1 to 10 carbon atoms. Specific examples of the phenylphosphonic acid include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, and diethoxycarbonylphenylphosphonic acid. Unsubstituted phenylphosphonic acid is preferred.

The phenylphosphonic acid metal salt may be a salt of lithium, sodium, magnesium, aluminium, potassium, calcium, barium, copper, zinc, iron, cobalt or nickel. A zinc salt is preferred.

In the present invention, when the organic crystallization nucleator is at least one compound selected from the group consisting of compounds having a hydroxy group and an amide group in a molecule and hydroxy fatty acid esters, combined with the phenylphosphonic acid metal salt, for achieving the effects of the present invention, a ratio of at least one compound selected from the group consisting of compounds having a hydroxy group and an amide group in a molecule and hydroxy fatty acid esters to the phenylphosphonic acid metal salt, at least one compound/the phenylphosphonic acid metal salt (mass ratio), is preferably 20/80 to 80/20, more preferably 30/70 to 70/30, and even more preferably 40/60 to 60/40.

[Polylactic Acid Resin Composition]

The polylactic acid resin composition of the present invention contains the polylactic acid resin and the metal hydrate surface-treated with the silane coupling agent, and preferably further contains the plasticizer and the organic crystallization nucleator.

Incorporation of the polylactic acid resin and the metal hydrate surface-treated with the silane coupling agent in the polylactic acid resin composition of the present invention produces special effects of impact resistance and flexibility to the polylactic acid resin composition. The reason for such special effects is still unknown, but is assumed that an amino group or a mercapto group of the silane coupling agent on the surface of the metal hydrate may interact with a hydroxy group of the polylactic acid resin.

Incorporation of the polylactic acid resin and the metal hydrate surface-treated with the isocyanate-silane coupling agent in the polylactic acid resin composition of the present invention produces special effects of heat resistance, impact resistance, and flexibility to the polylactic acid resin composition. The reason for such special effects is still unknown, but is assumed that the special effects are caused by an isocyanate group of the silane coupling agent on the surface of the metal hydrate having a function, such as reaction, on a hydroxy group of the polylactic acid resin.

For achieving the object of the present invention, a content of the polylactic acid resin in the polylactic acid resin composition of the present invention is preferably not less than 30% by mass, and more preferably not less than 40% by mass.

For achieving the object of the present invention, in the polylactic acid resin composition of the present invention, a ratio of the polylactic acid resin to the metal hydrate surface-treated with the silane coupling agent, polylactic acid resin/metal hydrate (mass ratio), is preferably 30/70 to 70/30, and even more preferably 40/60 to 60/40.

For achieving the object of the present invention, in the polylactic acid resin composition of the present invention, a content of the plasticizer is preferably 5 to 50 parts by mass, more preferably 7 to 30 parts by mass, and even more preferably 8 to 30 parts by mass to 100 parts by mass of the polylactic acid resin.

For achieving sufficient impact resistance and flexibility, in the polylactic acid resin composition of the present invention, a content of the organic crystallization nucleator is preferably 0.05 to 5 parts by mass, more preferably 0.1 to 3 parts by mass, and even more preferably 0.2 to 2 parts by mass to 100 parts by mass of the polylactic acid resin.

The composition of the present invention may further contain an inorganic filler. Examples of the inorganic filler include silicates such as talc, smectite, kaolin, mica, and montmorillonite, inorganic compounds such as silica, magnesium oxide, titanium oxide, and calcium carbonate, and fibrous inorganic fillers such as glass fiber, carbon fiber, graphite fiber, wollastonite, potassium titanate whisker, and silicon-based whisker. For achieving good dispersibility, an average particle size of the inorganic filler is preferably 0.1 to 20 μm, and more preferably 0.1 to 10 μm. For increasing rigidity, an aspect ratio of the fibrous inorganic filler is preferably not less than 5, more preferably not less than 10, and even more preferably not less than 20. From the viewpoints of moldability and heat resistance of the polylactic acid resin molded article, among inorganic fillers, preferred are silicates and fibrous inorganic fillers. Among silicates, preferred are talc and mica, and more preferred is talc. From the viewpoints of moldability and transparency of the polylactic acid resin molded article, preferred is silica. From the viewpoint of heat resistance of the polylactic acid resin molded article, among fibrous inorganic fillers, preferred is glass fiber.

An average particle size of the inorganic filler can be determined by measuring a median size based on the volume by diffractive scattering. Examples of a commercial measurement apparatus include Beckman Coulter LS 230 Laser Diffraction Particle Size Analyzer.

For achieving sufficient heat resistance and impact resistance, a content of the inorganic filler in the polylactic acid resin composition of the present invention is preferably 1 to 200 parts by mass, more preferably 3 to 50 parts by mass, and even more preferably 5 to 40 parts by mass to 100 parts by mass of the polylactic acid resin.

The polylactic acid resin composition of the present invention may further contain a hydrolysis inhibitor. Examples of the hydrolysis inhibitor include carboimide compounds such as polycarbodiimide compounds or monocarbodiimide compounds. From the viewpoint of moldability of the polylactic acid resin molded article, preferred are polycarbodiimide compounds. From the viewpoints of heat resistance and impact resistance of the polylactic acid resin molded article and blooming resistance of the organic crystallization nucleator, preferred are monocarbodiimide compounds. From the viewpoint of durability of the polylactic acid resin molded article, preferred is a combination use of a monocarbodiimide compound and a polycarbodiimide compound.

Examples of the polycarbodiimide compound include poly (4,4'-diphenylmethanecarbodiimide), poly(4,4'-dicyclohexylmethanecarbodiimide), poly(1,3,5-triisopropylbenzene)polycarbodiimide, poly(1,3,5-triisopropylbenzene, and 1,5-diisopropylbenzene)polycarbodiimide. Examples of the monocarbodiimide compound include dicyclohexylcarbodiimide, diisopropylcarbodiimide, diphenylcarbodiimide, bis(methylphenyl)carbodiimide, bis(methoxyphenyl)carbodiimide, bis(nitrophenyl)carbodiimide, bis(dimethylphenyl)carbodiimide, bis(diisopropylphenyl)carbodiimide, bis (di-t-butyl)carbodiimide, N-ethyl-N'-(3-dimethylaminopropyl)carbodiimide, bis(triphenylsilyl)carbodiimide, and N,N'-di-2,6-diisopropylphenylcarbodiimide.

For satisfying moldability, heat resistance, and impact resistance of the polylactic acid resin molded article and blooming resistance of the organic crystallization nucleator, these carbodiimide compounds may be used alone or in combination. Commercially available products may also be used, including Carbodilite LA-1 (Nisshinbo Chemical Inc.) for poly(4,4'-dicyclohexylmethanecarbodiimide), Stabaxol P and P-100 (Rhein Chemie Japan Ltd.) for poly(1,3,5-triisopropylbenzene)polycarbodiimide and poly (1,3,5-triisopropylbenzene and 1,5-diisopropylbenzene)polycarbodiimide respectively, and Stabaxol I and I-LF (Rhein Chemie Japan Ltd.) for N,N'-di-2,6-diisopropylphenylcarbodiimide.

From the viewpoint of moldability of the polylactic acid resin molded article, a content of the hydrolysis inhibitor in the polylactic acid resin composition of the present invention is preferably 0.05 to 7 parts by mass, and even more preferably 0.1 to 3 parts by mass to 100 parts by mass of the polylactic acid resin.

The polylactic acid resin composition of the present invention may further contain other components such as a hindered phenol or phosphite antioxidant, and a lubricant such as a hydrocarbon wax or an anion surfactant. Each content of the antioxidant and the lubricant is preferably 0.05 to 3 parts by mass, and more preferably 0.1 to 2 parts by mass to 100 parts by mass of the polylactic acid resin.

The polylactic acid resin composition of the present invention may further contain additives other than those described above within the range that does not obstruct the object of the present invention, including a flame retardant, an antistatic agent, an antifogging agent, a light stabilizer, a UV absorber, a pigment, a fungicide, an antibacterial agent, and a foaming agent.

For increasing flame retardancy, breaking strain by bending, impact resistance, and heat resistance, the polylactic acid resin composition of the present invention preferably contains a flame retardant. Any known flame retardant can be used. Preferred are phosphorus flame retardants, and more preferred is cyclic phosphonitrilic acid phenyl ester (cyclic phenoxyphosphazene). A content of the flame retardant can be determined by monitoring the effects of the flame retardant. From the viewpoint of valance of flame retardancy, breaking strain by bending, impact resistance, and heat resistance, the content is preferably 0.5 to 20 parts by weight, and more preferably 1 to 15 parts by weight to 100 parts by weight of the polylactic acid resin.

[Polylactic Acid Resin Molded Article and Method for Production Thereof]

The polylactic acid resin molded article of the present invention is produced by molding the polylactic acid resin composition of the present invention. A specific example of production includes mixing the metal hydrate surface-treated with the silane coupling agent and, if needed, the plasticizer and the organic crystallization nucleator with the polylactic acid resin, while melting the polylactic acid resin by an extruder or the like and then filling a mold with the resultant melted mixture with an injection-molding machine or the like to mold. A mold temperature is not specifically limited, but preferably, for enhancing workability, not higher than 110° C., more preferably not higher than 90° C., and even more preferably not higher than 80° C. For increasing a crystallization speed of the polylactic acid resin composition, the mold temperature is preferably not lower than 30° C., more preferably not lower than 40° C., and even more preferably not lower than 60° C. Considering these together, the mold temperature is preferably 30 to 110° C., more preferably 40 to 90° C., and even more preferably 60 to 80° C.

A preferred method of producing the polylactic acid resin molded article of the present invention includes a step of melting and kneading the polylactic acid resin composition containing the polylactic acid resin and the metal hydrate surface-treated with the silane coupling agent (hereinafter, referred to as step (1)) and a step of filling the melted mixture of the step (1) in a mold set to a temperature of not higher than 110° C. to form (hereinafter, referred to as step (2)).

In the present invention, preferred are a method of conducting the step (1), then cooling the resultant mixture to form an amorphous state (i.e., with a condition such that a crystallization degree is not more than 1%, measured by high-angle x-ray diffraction), and conducting the step (2), and a method of conducting the step (1), then cooling the resultant mixture and immediately conducting the step (2). From the viewpoint of expression of effects of increasing a crystallization speed of the present invention, the method of conducting the step (1), cooling the resultant mixture and immediately conducting the step (2) is more preferred.

In the method of production of the present invention, specific examples of the step (2) include a process of filling the polylactic acid resin composition in a mold set to a temperature not more than 110° C. to form with an injection-molding machine. For increasing a crystallization speed and enhancing workability, a mold temperature in the step (2) is not higher than 110° C., preferably not higher than 90° C., and more preferably not higher than 80° C. The mold temperature is also preferably not lower than 30° C., more preferably not lower than 40° C., and even more preferably not lower than 60° C. Considering these together, the mold temperature is preferably 30 to 110° C., more preferably 40 to 90° C., and even more preferably 60 to 80° C.

For achieving a relative crystallization degree of not less than 60% and increasing productivity, in the step (2) of the present invention, a retention time in a mold is preferably 5 to 60 seconds, more preferably 8 to 50 seconds, and even more preferably 10 to 45 seconds.

EXAMPLES

The following Examples demonstrate the present invention. Examples are intended to illustrate the present invention and not to limit the present invention.

Examples 1 to 27 describe compositions each containing an amino-silane coupling agent or mercapto-silane coupling agent and Examples 28 to 46 describe compositions each containing an isocyanate-silane coupling agent in detail.

Examples 1 to 27, Examples 28 to 46, Comparative Examples 1 to 3

Polylactic acid resin compositions according to the present invention shown in Table 1 (A to Z), comparative compositions (a to c), and compositions according to the present invention shown in Table 2 (2-A to 2-S) were melted and kneaded at 190° C. in a twin-screw extruder (IKEGAI, PCM-45), cut with a strand to give pellets of the polylactic acid resin compositions.

The resultant pellets were dried for one day at 70° C. under reduced pressure to reduce a water content to 500 ppm or less.

TABLE 1

Polylactic acid resin composition [content ratio (mass ratio)]

| | | |
|---|---|---|
| invention product | A | LACEA H400*[1]/Al(OH)$_3$(treatment 11)*[2] = 50/50 |
| | B | LACEA H400*[1]/Al(OH)$_3$(treatment 12)*[3] = 50/50 |
| | C | LACEA H400*[1]/Al(OH)$_3$(treatment 13)*[4] = 50/50 |
| | D | LACEA H400*[1]/Al(OH)$_3$(treatment14)*[5] = 50/50 |
| | E | LACEA H400*[1]/Al(OH)$_3$(treatment11)*[2] = 70/30 |
| | F | LACEA H400*[1]/Al(OH)$_3$(treatment13)*[4] = 70/30 |
| | G | LACEA H400*[1]/Al(OH)$_3$(treatment11)*[2] = 30/70 |
| | H | LACEA H400*[1]/Al(OH)$_3$(treatment13)*[4] = 30/70 |
| | I | LACEA H400*[1]/Al(OH)$_3$(treatment11)*[2]/(MeEO3)2SA*[6] = 45/50/5 |
| | J | LACEA H400*[1]/Al(OH)$_3$(treatment13)*[4]/(MeEO3)2SA*[6] = 45/50/5 |
| | K | LACEA H400*[1]/Al(OH)$_3$(treatment11)*[2]/(MeEO3)3TA*[7] = 45/50/5 |
| | L | LACEA H400*[1]/Al(OH)$_3$(treatment13)*[4]/(MeEO3)3TA*[7] = 45/50/5 |
| | M | LACEA H400*[1]/Al(OH)$_3$(treatment 11)*[2]/POE(6)GlyAC*[8] = 45/50/5 |
| | N | LACEA H400*[1]/Al(OH)$_3$(treatment 13)*[4]/POE(6)GlyAC*[8] = 45/50/5 |
| | O | LACEA H400*[1]/Al(OH)$_3$(treatment 11)*[2]/DAY101*[9] = 45/50/5 |
| | P | LACEA H400*[1]/Al(OH)$_3$(treatment 13)*[4]/DAY101*[9] = 45/50/5 |
| | Q | LACEA H400*[1]/Al(OH)$_3$(treatment 11)*[2]/(MeEO3)2SA*[6]/OHEB*[10]/PPA-Zn*[11] = 44/50/5/0.5/0.5 |
| | R | LACEA H400*[1]/Al(OH)$_3$(treatment 13)*[4]/(MeEO3)2SA*[6]/OHEB*[10]/PPA-Zn*[11] = 44/50/5/0.5/0.5 |
| | S | LACEA H400*[1]/Al(OH)$_3$(treatment 11)*[2]/(MeEO3)2SA*[6]/DAY101*[9]/OHEB*[10]/PPA-Zn*[11] = 44/50/2.5/2.5/0.5/0.5 |
| | T | LACEA H400*[1]/Al(OH)$_3$(treatment 11)*[2]/(MeEO3)2SA*[6]/DAY101*[9]/OHEB*[10]/PPA-Zn*[11]/MCI*[19]/PCI*[20] = 43/50/2.5/2.5/0.5/0.5/0.5/0.5 |
| | U | LACEA H400*[1]/Al(OH)$_3$(treatment 11)*[2]/(MeEO3)2SA*[6]/OHEB*[10]/PPA-Zn*[11]/SPS-100*[18]/MCI*[19]/PCI*[20] = 44/47/5/0.5/0.5/2/0.5/0.5 |
| | V | LACEA H400*[1]/Al(OH)$_3$(treatment 11)*[2]/(MeEO3)2SA*[6]/DAY101*[9]/OHEB*[10]/PPA-Zn*[11]/SPS-100*[18]/MCI*[19]/PCI*[20] = 44/47/2.5/2.5/0.5/0.5/2/0.5/0.5 |
| | W | LACEA H400*[1]/Al(OH)$_3$(treatment 11)*[2]/(MeEO3)2SA*[6]/DAY101*[9]/OHEB*[10]/PPA-Zn*[11]/SPS-100*[18]/MCI*[19]/PCI*[20] = 49/39/2.5/2.5/0.5/0.5/5/0.5/0.5 |
| | X1 | LACEA H400*[1]/Al(OH)$_3$(treatment 11)*[2]/(MeEO3)2SA*[6]/DAY101*[9]/OHEB*[10]/PPA-Zn*[11]/SPS-100*[18]/MCI*[19]/PCI*[20]/glass fiber(1)*[15] = 42/44/2.5/2.5/0.5/0.5/2/0.5/0.5/5 |
| | X2 | LACEA H400*[1]/Al(OH)$_3$(treatment 11)*[2]/(MeEO3)2SA*[6]/DAY101*[9]/OHEB*[10]/PPA-Zn*[11]/SPS-100*[18]/MCI*[19]/PCI*[20]/glass fiber(1)*[15] = 47/36/2.5/2.5/0.5/0.5/5/0.5/0.5/5 |
| | Y | LACEA H400*[1]/Al(OH)$_3$(treatment 11)*[2]/(MeEO3)2SA*[6]/DAY101*[9]/OHEB*[10]/PPA-Zn*[11]/SPS-100*[18]/MCI*[19]/PCI*[20]/glass fiber(2)*[16] = 42/44/2.5/2.5/0.5/0.5/2/0.5/0.5/5 |
| | Z | LACEA H400*[1]/Al(OH)$_3$(treatment 11)*[2]/(MeEO3)2SA*[6]/DAY101*[9]/OHEB*[10]/PPA-Zn*[11]/SPS-100*[18]/MCI*[19]/PCI*[20]/glass fiber(3)*[17] = 42/44/2.5/2.5/0.5/0.5/2/0.5/0.5/5 |
| Comparative product | a | LACEA H400*[1]/Al(OH)$_3$*[12] = 50/50 |
| | b | LACEA H400*[1]/Al(OH)$_3$(treatment2)*[13] = 50/50 |
| | c | LACEA H400*[1]/Al(OH)$_3$(treatment3)*[14] = 50/50 |

TABLE 2

Polylactic acid resin composition [Content ratio (weight ratio)]

| | | |
|---|---|---|
| Invention product | 2-A | LACEA H400*[1]/Al(OH)$_3$(treatment 21)*[21] = 50/50 |
| | 2-B | LACEA H400*[1]/Al(OH)$_3$(treatment 22)*[22] = 50/50 |
| | 2-C | LACEA H400*[1]/Al(OH)$_3$(treatment 21)*[21] = 70/30 |
| | 2-D | LACEA H400*[1]/Al(OH)$_3$(treatment 21)*[21] = 30/70 |
| | 2-E | LACEA H400*[1]/Al(OH)$_3$(treatment21)*[21]/(MeEO3)2SA*[6] = 45/50/5 |
| | 2-F | LACEA H400*[1]/Al(OH)$_3$(treatment21)*[21]/(MeEO3)3TA*[7] = 45/50/5 |
| | 2-G | LACEA H400*[1]/Al(OH)$_3$(treatment21)*[21]/POE(6)GlyAC*[8] = 45/50/5 |
| | 2-H | LACEA H400*[1]/Al(OH)$_3$(treatment21)*[21]/DAY101*[9] = 45/50/5 |
| | 2-I | LACEA H400*[1]/Al(OH)$_3$(treatment21)*[21]/(MeEO3)2SA*[6]/OHEB*[10]/PPA-Zn*[11] = 44/50/5/0.5/0.5 |
| | 2-J | LACEA H400*[1]/Al(OH)$_3$(treatment21)*[21]/(MeEO3)2SA*[6]/DAY101*[9]/OHEB*[10]/PPA-Zn*[11] = 44/50/2.5/2.5/0.5/0.5 |
| | 2-K | U' z S-17*[23]/Al(OH)3(treatment21)*[21]/(MeEO3)2SA*[6]/OHEB*[10]/PPA-Zn*[11] = 44/50/5/0.5/0.5 |
| | 2-L | LACEA H400*[1]/Al(OH)$_3$(treatment21)*[21]/(MeEO3)2SA*[6]/OHEB*[10]/PPA-Zn*[11]/MCI*[19]/PCI*[20] = 43/50/5/0.5/0.5/0.5/0.5 |
| | 2-M | LACEA H400*[1]/Al(OH)$_3$(treatment21)*[21]/(MeEO3)2SA*[6]/OHEB*[10]/PPA-Zn*[11]/SPS-100*[18]/MCI*[19]/PCI*[20] = 44/47/5/0.5/0.5/2/0.5/0.5 |

TABLE 2-continued

| | Polylactic acid resin composition [Content ratio (weight ratio)] |
|---|---|
| 2-N | LACEA H400*1/Al(OH)3(treatment21)*21/(MeEO3)2SA*6/DAY101*9/OHEB*10/PPA-Zn*11/<br>SPS-100*18/MCI*19/PCI*20 = 44/47/2.5/2.5/0.5/0.5/2/0.5/0.5 |
| 2-O | LACEA H400*1/Al(OH)3(treatment21)*21/(MeEO3)2SA*6/DAY101*9/OHEB*10/PPA-Zn*11/<br>SPS-100*18/MCI*19/PCI*20 = 49/39/2.5/2.5/0.5/0.5/5/0.5/0.5 |
| 2-P | LACEA H400*1/Al(OH)3(treatment21)*21/(MeEO3)2SA*6/DAY101*9/OHEB*10/PPA-Zn*11/<br>SPS-100*18/MCI*19/PCI*20/glass fiber(1)*15 = 42/44/2.5/2.5/0.5/0.5/2/0.5/0.5/5 |
| 2-Q | LACEA H400*1/Al(OH)3(treatment21)*21/(MeEO3)2SA*6/DAY101*9/OHEB*10/PPA-Zn*11/<br>SPS-100*18/MCI*19/PCI*20/glass fiber(1)*15 = 47/36/2.5/2.5/0.5/0.5/5/0.5/0.5/5 |
| 2-R | LACEA H400*1/Al(OH)3(treatment21)*21/(MeEO3)2SA*6/DAY101*9/OHEB*10/PPA-Zn*11/<br>SPS-100*18/MCI*19/PCI*20/glass fiber(2)*16 = 42/44/2.5/2.5/0.5/0.5/2/0.5/0.5/5 |
| 2-S | LACEA H400*1/Al(OH)3(treatment21)*21/(MeEO3)2SA*6/DAY101*9/OHEB*10/PPA-Zn*11/<br>SPS-100*18/MCI*19/PCI*20/glass fiber(3)*17 = 42/44/2.5/2.5/0.5/0.5/2/0.5/0.5/5 |

In Tables 1 and 2, *1 to *23 means the followings.

*1: polylactic acid resin (Mitsui Chemicals, Inc., LACEA H-400)

*2: amino-silane coupling agent-treated aluminium hydroxide prepared by treating aluminium hydroxide (Nippon Light Metal Co., Ltd., BE033, average particle size: 2 µm, content of the alkali metal substance: 0.01% by mass) with an amino-silane coupling agent (N-phenyl-3-aminopropyltrimethoxysilane, Shin-Etsu Chemical Co., Ltd., KBM-573) at a mass ratio of amino-silane coupling agent/aluminium hydroxide of 1/99 (this treatment is referred to as treatment 11)

*3: amino-silane coupling agent-treated aluminium hydroxide prepared by treating aluminium hydroxide (Nippon Light Metal Co., Ltd., BE033, average particle size: 2 µm, content of the alkali metal substance: 0.01% by mass) with an amino-silane coupling agent (N-phenyl-3-aminopropyltrimethoxysilane, Shin-Etsu Chemical Co., Ltd., KBM-573) at a mass ratio of amino-silane coupling agent/aluminium hydroxide of 1.5/98.5 (this treatment is referred to as treatment 12)

*4: mercapto-silane coupling agent-treated aluminium hydroxide prepared by treating aluminium hydroxide (Nippon Light Metal Co., Ltd., BE033, average particle size: 2 µm, content of the alkali metal substance: 0.01% by mass) with a mercapto-silane coupling agent (3-mercaptopropyltrimethoxysilane, Shin-Etsu Chemical Co., Ltd., KBM-803) at a mass ratio of mercapto-silane coupling agent/aluminium hydroxide of 1/99 (this treatment is referred to as treatment 13).

*5: mercapto-silane coupling agent-treated aluminium hydroxide prepared by treating aluminium hydroxide (Nippon Light Metal Co., Ltd., BE033, average particle size: 2 µm, content of the alkali metal substance: 0.01% by mass) with a mercapto-silane coupling agent (3-mercaptopropyltrimethoxysilane, Shin-Etsu Chemical Co., Ltd., KBM-803) at a mass ratio of mercapto-silane coupling agent/aluminium hydroxide of 1.5/98.5 (this treatment is referred to as treatment 14).

*6: diester of succinic acid and triethylene glycol monomethyl ether

*7: triester of 1,3,6-hexanetricarboxylic acid and triethylene glycol monomethyl ether

*8: glycerol triacetate-ethylene oxide adduct at an addition mole number of 6

*9: adipate diester (Daihachi Chemical Industry Co., Ltd., DAIFATTY-101)

*10: ethylenebis (12-hydroxystearic acid amide) (Nippon kasei Chemical Co., Ltd., Slipax H)

*11: unsubstituted phenylphosphonic acid zinc salt (Nissan Chemical Industries Ltd., Ppa-Zn)

*12: aluminium hydroxide (Nippon Light Metal Co., Ltd., BE033, average particle size: 2 µm, content of the alkali metal substance: 0.01% by mass)

*13: epoxy-silane coupling agent-treated aluminium hydroxide prepared by treating aluminium hydroxide (Nippon Light Metal Co., Ltd., BE033, average particle size: 2 µm, content of the alkali metal substance: 0.01% by mass) with an epoxy-silane coupling agent (3-glycidoxypropyltrimethoxysilane, Shin-Etsu Chemical Co., Ltd., KBM-403) at a mass ratio of epoxy-silane coupling agent/aluminium hydroxide of 1/99 (this treatment is referred to as treatment 2)

*14: vinyl-silane coupling agent-treated aluminium hydroxide prepared by treating aluminium hydroxide (Nippon Light Metal Co., Ltd., BE033, average particle size: 2 µm, content of the alkali metal substance: 0.01% by mass) with a vinyl-silane coupling agent (vinyltrimethoxysilane, Shin-Etsu Chemical Co., Ltd., KBM1003) at a mass ratio of vinyl-silane coupling agent/aluminium hydroxide of 1/99 (this treatment is referred to as treatment 3)

*15: glass fiber (1) (Nippon Electric Glass Co., Ltd., T187, Φ 12 µm)

*16: glass fiber (2) (Owens Corning Japan Ltd., 03JAFT792, Φ 10 µm)

*17: glass fiber (3) (Owens Corning Japan Ltd., 03DEFT792, Φ 6 µm)

*18: cyclic phenoxyphosphazene (Otsuka Chemical Co., Ltd., SPS-100)

*19: diisopropylphenylcarbodiimide (Rhein Chemie Japan Ltd., Stabaxol 1-LF)

*20: poly (diisopropylphenylcarbodiimide) (Rhein Chemie Japan Ltd., Stabaxol P)

*21: isocyanate-silane coupling agent-treated aluminium hydroxide prepared by treating aluminium hydroxide (Nippon Light Metal Co., Ltd., BE033, average particle size: 2 µm, content of the alkali metal substance: 0.01% by mass) with an isocyanate-silane coupling agent (3-isocyanatepropyltriethoxysilane, Shin-Etsu Chemical Co., Ltd., KBE-9007) at a mass ratio of isocyanate-silane coupling agent/aluminium hydroxide of 1/99 (this treatment is referred to as treatment 21)

*22: isocyanate-silane coupling agent-treated aluminium hydroxide prepared by treating aluminium hydroxide (Nippon Light Metal Co., Ltd., BE033, average particle size: 2 µm, content of the alkali metal substance: 0.01% by mass) with an isocyanate-silane coupling agent (3-isocyanatepropyltriethoxysilane, Shin-Etsu Chemical Co., Ltd., KBE-9007) at a mass ratio of isocyanate-silane coupling agent/aluminium hydroxide of 1.5/98.5 (this treatment is referred to as treatment 22)

*23: polylactic acid resin (Toyota Motor Corporation, U'z S-17)

In treatments 11, 13, 21, 2, and 3, a method of surface-treating a metal hydrate with a silane coupling agent comprising dissolving 5 g of silane coupling agent in 200 g of organic solvent (acetone), adding 500 g of metal hydrate to the solution, mixing them with a mixer, removing the organic solvent, and drying. In treatments 22, 12, and 14, a method of surface-treating was similarly performed, except that an amount of silane coupling agent was 7.5 g.

Next, pellets thus prepared were injection-molded with an injection-molding machine (Japan Steel Works, LTD., J75E-D) under conditions of a cylinder temperature of 200° C., a mold temperature of 80° C., and a molding time of 10 minutes to give a test piece [a rectangular column (125 mm by 12 mm by 6 mm)]. Physical properties of the test piece were evaluated by the following methods. Results are shown in Tables 3 and 4.

<Bending Test>

A rectangular column (125 mm by 12 mm by 6 mm) was subjected to a bending test with TENSILON (Orientec Co., Ltd., TENSILON universal tester RTC-1210A) in accordance with JIS K7203 to determine a breaking strain by bending. A crosshead speed was 3 mm/min.

The higher breaking strain by bending means the better flexibility.

<Impact Resistance>

A rectangular column (63 mm by 12 mm by 5 mm) was measured for Izod impact strength with an impact tester (Ueshima Seisakusho Co., Ltd, model 863) in accordance with JIS-K7110.

The higher Izod impact strength means the better impact resistance.

<Thermal Distortion Temperature>

A square column (125 mm by 12 mm by 6 mm) was measured for a distortion temperature at which generating 0.25 mm deflection under a load of 1.81 MPa with a thermal distortion tester (Toyo Seiki Seisaku-Sho, Ltd., B-32) in accordance with JIS-K7191. The higher temperature means the better heat resistance.

TABLE 3

|  |  | Resin composition | Breaking strain by bending (%) | Impact resistance (J/m) |
|---|---|---|---|---|
| Example | 1 | A | 5 | 50 |
|  | 2 | B | 5 | 50 |
|  | 3 | C | 5.2 | 49 |
|  | 4 | D | 5.1 | 50 |
|  | 5 | E | 5.9 | 65 |
|  | 6 | F | 5.7 | 64 |
|  | 7 | G | 4.5 | 45 |
|  | 8 | H | 4.5 | 45 |
|  | 9 | I | 7.5 | 70 |
|  | 10 | J | 7.4 | 72 |
|  | 11 | K | 7.3 | 69 |
|  | 12 | L | 7.2 | 70 |
|  | 13 | M | 7.3 | 65 |
|  | 14 | N | 7.3 | 65 |
|  | 15 | O | 7.3 | 64 |
|  | 16 | P | 7.2 | 63 |
|  | 17 | Q | 8.3 | 80 |
|  | 18 | R | 8.2 | 80 |
|  | 19 | S | 7.9 | 70 |
|  | 20 | T | 8.3 | 72 |
|  | 21 | U | 9.8 | 80 |
|  | 22 | V | 9.1 | 75 |
|  | 23 | W | 10.3 | 85 |
|  | 24 | X 1 | 7.5 | 85 |
|  | 25 | X 2 | 8.4 | 95 |
|  | 26 | Y | 7.4 | 90 |
|  | 27 | Z | 7.3 | 95 |

TABLE 3-continued

|  |  | Resin composition | Breaking strain by bending (%) | Impact resistance (J/m) |
|---|---|---|---|---|
| Comparative example | 1 | a | 2.2 | 30 |
|  | 2 | b | 2.2 | 30 |
|  | 3 | c | 2 | 25 |

TABLE 4

|  |  | Resin composition | Breaking strain by bending (%) | Impact resistance (J/m) | Thermal distortion temperature (° C.) |
|---|---|---|---|---|---|
| Example | 28 | 2-A | 5.5 | 55 | 65 |
|  | 29 | 2-B | 5.5 | 55 | 65 |
|  | 30 | 2-C | 6.5 | 70 | 58 |
|  | 31 | 2-D | 5 | 50 | 70 |
|  | 32 | 2-E | 8 | 75 | 65 |
|  | 33 | 2-F | 7.8 | 75 | 60 |
|  | 34 | 2-G | 7.8 | 70 | 60 |
|  | 35 | 2-H | 7.8 | 70 | 60 |
|  | 36 | 2-I | 9 | 85 | 80 |
|  | 37 | 2-J | 8.7 | 80 | 80 |
|  | 38 | 2-K | 8.7 | 80 | 90 |
|  | 39 | 2-L | 9 | 82 | 80 |
|  | 40 | 2-M | 10.5 | 85 | 75 |
|  | 41 | 2-N | 10.2 | 85 | 70 |
|  | 42 | 2-O | 11.4 | 90 | 65 |
|  | 43 | 2-P | 8.5 | 90 | 100 |
|  | 44 | 2-Q | 9.4 | 100 | 95 |
|  | 45 | 2-R | 8.4 | 90 | 105 |
|  | 46 | 2-S | 8.3 | 90 | 110 |
| Comparative example | 1 | a | 2.2 | 30 | 50 |
|  | 2 | b | 2.2 | 30 | 50 |
|  | 3 | c | 2 | 25 | 47 |

Results in Table 2 show that addition of an amino-silane coupling agent or a mercapto-silane coupling agent-treated metal hydrate to polylactic acid resin compositions according to the present invention (Examples 1 to 27) could increase breaking strain by bending and impact resistance of the compositions.

It is also shown that polylactic acid resin compositions (Comparative Examples 1 to 3) containing any of a metal hydrate not treated with a silane coupling agent or a metal hydrate treated with other silane coupling agent than the amino- or mercapto-silane coupling agent did not have increased breaking strain by bending and impact resistance.

It is also shown that polylactic acid resin compositions according to the present invention (Examples 9 to 27) containing a plasticizer and a crystallization nucleator, as well as an amino-silane coupling agent or a mercapto-silane coupling agent-treated metal hydrate had further increased breaking strain by bending and impact resistance.

As described above, the polylactic acid resin composition of the present invention can have good breaking strain by bending (flexibility) and impact resistance.

The reason of production of effects of the invention is still unknown, but assumed that in a composition only containing a polylactic acid resin and a metal hydrate or a metal hydrate treated with other silane coupling agent than an amino- or mercapto-silane coupling agent, the polylactic acid resin and the metal hydrate form a weak interface and insufficiently exhibits effects of reinforcing the interface, while in a composition containing a metal hydrate treated with an amino- or mercapto-silane coupling agent, the polylactic acid resin and the metal hydrate form stronger interface than above to exhibit effects of the present invention.

Results in Table 4 show that addition of an isocyanate-silane coupling agent-treated metal hydrate to polylactic acid resin compositions according to the present invention (Examples 28 to 46) could increase breaking strain by bending, impact resistance, and a thermal distortion temperature of the compositions.

It is also shown that polylactic acid resin compositions (Comparative Examples 1 to 3) containing any of a metal hydrate not treated with a silane coupling agent or a metal hydrate treated with other silane coupling agent than an isocyanate-silane coupling agent did not have increased breaking strain by bending, impact resistance, and a thermal distortion temperature.

It is also shown that polylactic acid resin compositions according to the present invention (Examples 32 to 46) containing a plasticizer and a crystallization nucleator, as well as an isocyanate-silane coupling agent-treated metal hydrate had further increased breaking strain by bending, impact resistance, and a thermal distortion temperature.

Polylactic acid resin compositions according to the present invention (Examples 39 to 46) further containing a hydrolysis inhibitor and a flame retardant had further increased breaking strain by bending and impact resistance. Polylactic acid resin compositions according to the present invention (Examples 43 to 46) further containing glass fibers had a further increased thermal distortion temperature.

From these results, it is assumed that in a composition only containing a polylactic acid resin and a metal hydrate or a metal hydrate treated with other silane coupling agent than an isocyanate-silane coupling agent, the polylactic acid resin and the metal hydrate form a weak interface and insufficiently exhibits effects of reinforcing the interface. In a composition containing a metal hydrate treated with an isocyanate-silane coupling agent, the polylactic acid resin and the metal hydrate form a stronger interface than the above to improve physical properties.

The invention claimed is:

1. A polylactic acid resin composition, comprising:
    a polylactic acid resin,
    aluminum hydroxide surface-treated with at least one isocyanate-silane coupling agent, wherein the content of an alkali metal substance in the aluminum hydroxide is not more than 0.2% by mass, and
    a plasticizer selected from the group consisting of esters of polybasic acids with polyethylene glycol monoalkylethers and an acetylated product of an adduct wherein ethylene oxide and/or propylene oxide is added to glycerol;
    wherein the isocyanate-silane coupling agent is at least one compound selected from the group consisting of 3-isocyanatepropyltrimethoxysilane and 3-isocyanatepropyltriethoxysilane.

2. The polylactic acid resin composition according to claim 1, wherein the aluminum hydroxide surface-treated with the isocyanate-silane coupling agent is prepared by treating the aluminum hydroxide with the silane coupling agent at a mass ratio, silane coupling agent/metal hydrate, of 0.1/99.9 to 5/95.

3. The polylactic acid resin composition according to claim 1, wherein a mass ratio of the polylactic acid resin to the aluminum hydroxide surface-treated with the isocyanate-silane coupling agent, polylactic acid/aluminum hydroxide surface-treated with the isocyanate-silane coupling agent, is 30/70 to 70/30.

4. The polylactic acid resin composition according to claim 1, wherein the aluminum hydroxide is composed of particles having an average particle size of not more than 10 μm.

5. The polylactic acid resin composition according to claim 1, further comprising an organic crystallization nucleator.

6. A polylactic acid resin molded article, produced by molding the polylactic acid resin composition according to claim 1.

7. The polylactic acid resin composition according to claim 1, wherein the content of the plasticizer is 5 to 30 parts by mass to 100 parts by mass of the polylactic acid resin.

* * * * *